Dec. 20, 1955  M. C. BRYCELAND  2,727,666
SEALING AND EXHAUST MACHINE
Filed Oct. 16, 1952  6 Sheets-Sheet 1

INVENTOR
MAURICE C. BRYCELAND
BY Greenlowe
ATTORNEY

Dec. 20, 1955  M. C. BRYCELAND  2,727,666
SEALING AND EXHAUST MACHINE
Filed Oct. 16, 1952  6 Sheets-Sheet 3

INVENTOR
MAURICE C. BRYCELAND
BY
ATTORNEY

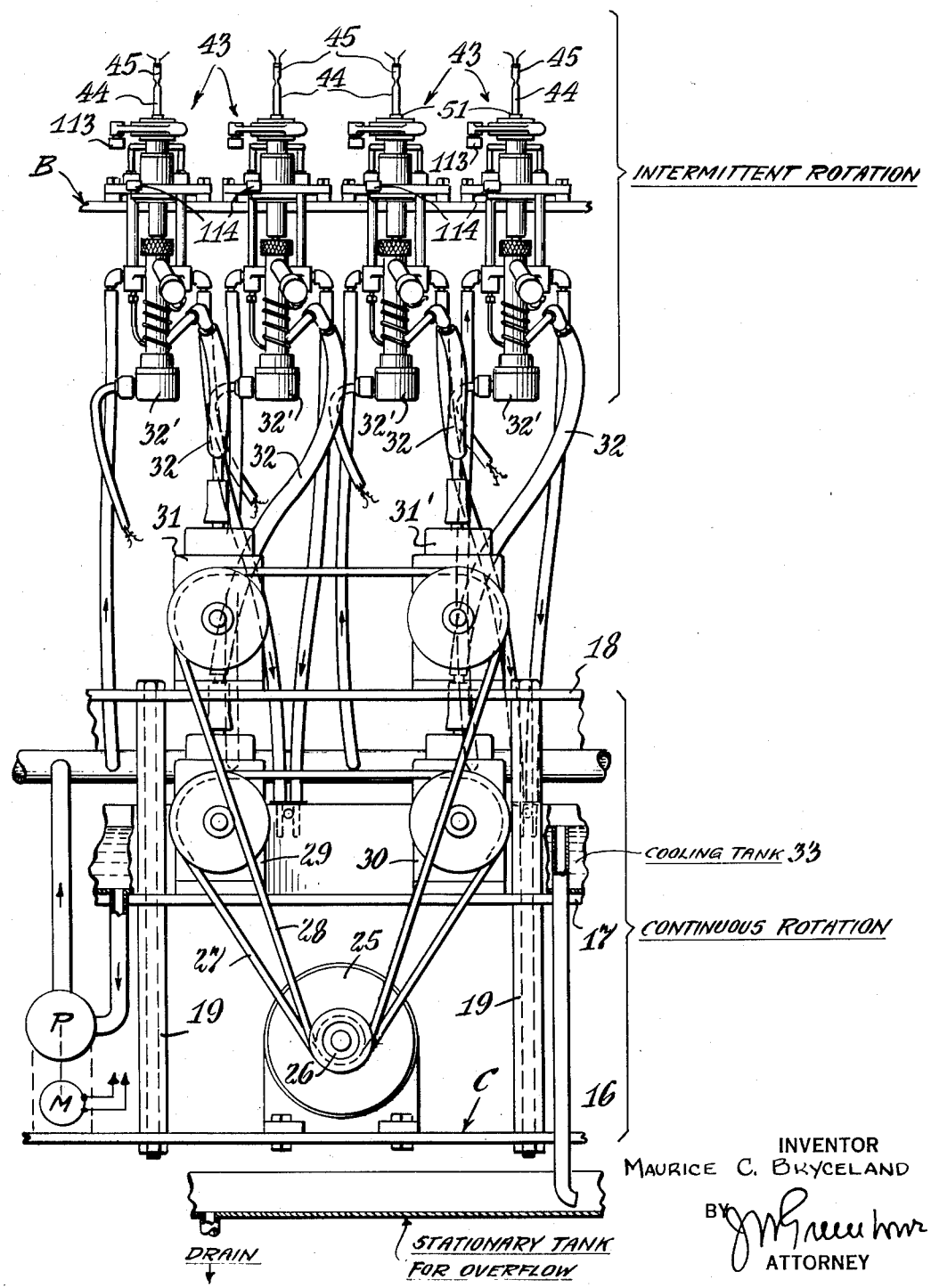

Dec. 20, 1955  M. C. BRYCELAND  2,727,666
SEALING AND EXHAUST MACHINE
Filed Oct. 16, 1952  6 Sheets-Sheet 5
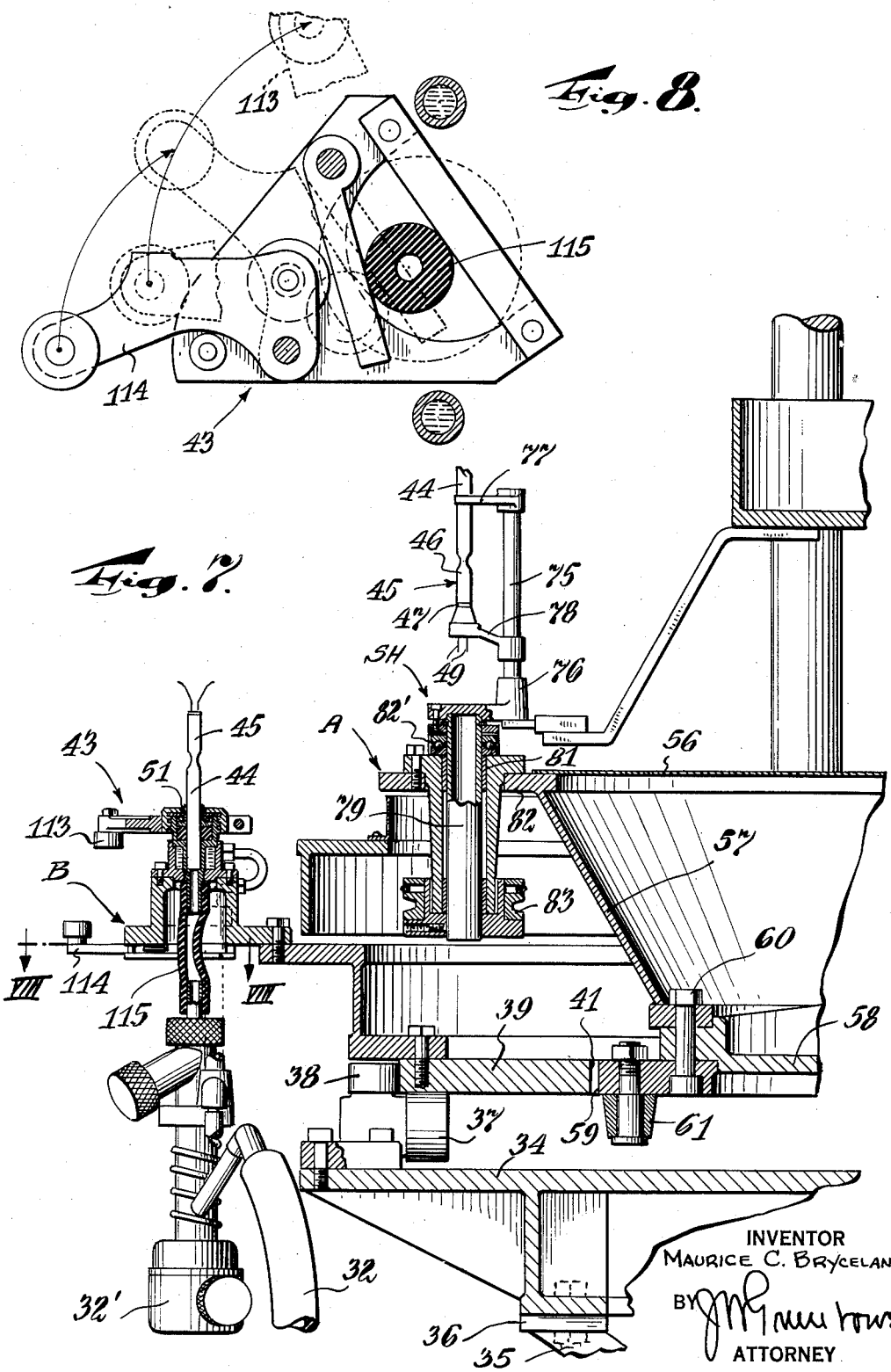
INVENTOR
MAURICE C. BRYCELAND
BY
ATTORNEY Dec. 20, 1955  M. C. BRYCELAND  2,727,666
SEALING AND EXHAUST MACHINE
Filed Oct. 16, 1952  6 Sheets-Sheet 6

INVENTOR
MAURICE C. BRYCELAND
BY
ATTORNEY

United States Patent Office 2,727,666
Patented Dec. 20, 1955

2,727,666

SEALING AND EXHAUST MACHINES

Maurice C. Bryceland, Harrison, N. J.

Application October 16, 1952, Serial No. 315,114

8 Claims. (Cl. 226—20.4)

The present invention relates to sealing-in and exhaust machines employed in the manufacture of vacuum devices, such as audions, electric lamps and similar devices.

One object of my invention is to provide a compact machine wherein the various operations including sealing-in and exhausting are so arranged and co-related as to facilitate loading and provide continuous exhaust at high speed with low maintenance.

Another object of the invention is to provide a machine so constructed and arranged that hollow bodies are moved intermittently through a given path and evacuated by means moved continuously through an adjacent path.

Another object of the invention is to evacuate hollow bodies supported on one conveyor by means of exhaust pumps supported on another conveyor in the absence of slide valves or the like.

Another object of the invention is to provide a machine with some convenient ratio of sealing heads to exhaust ports other than 1 to 1 both accommodated by one basic drive mechanism.

Other objects and advantages of the invention will be apparent from the following description together with the accompanying drawings in which, for the purpose of illustration, one practical embodiment of the invention is shown and in which:

Fig. 6 is a partial front elevational view of the machine showing flexible connections between pumps and exhaust parts;

Fig. 7 is an enlarged vertical cross-sectional view of a portion of the machine including sealing-in head and exhaust port;

Fig. 8 is an enlarged view taken on line VIII—VIII in Fig. 7;

Figure 1:
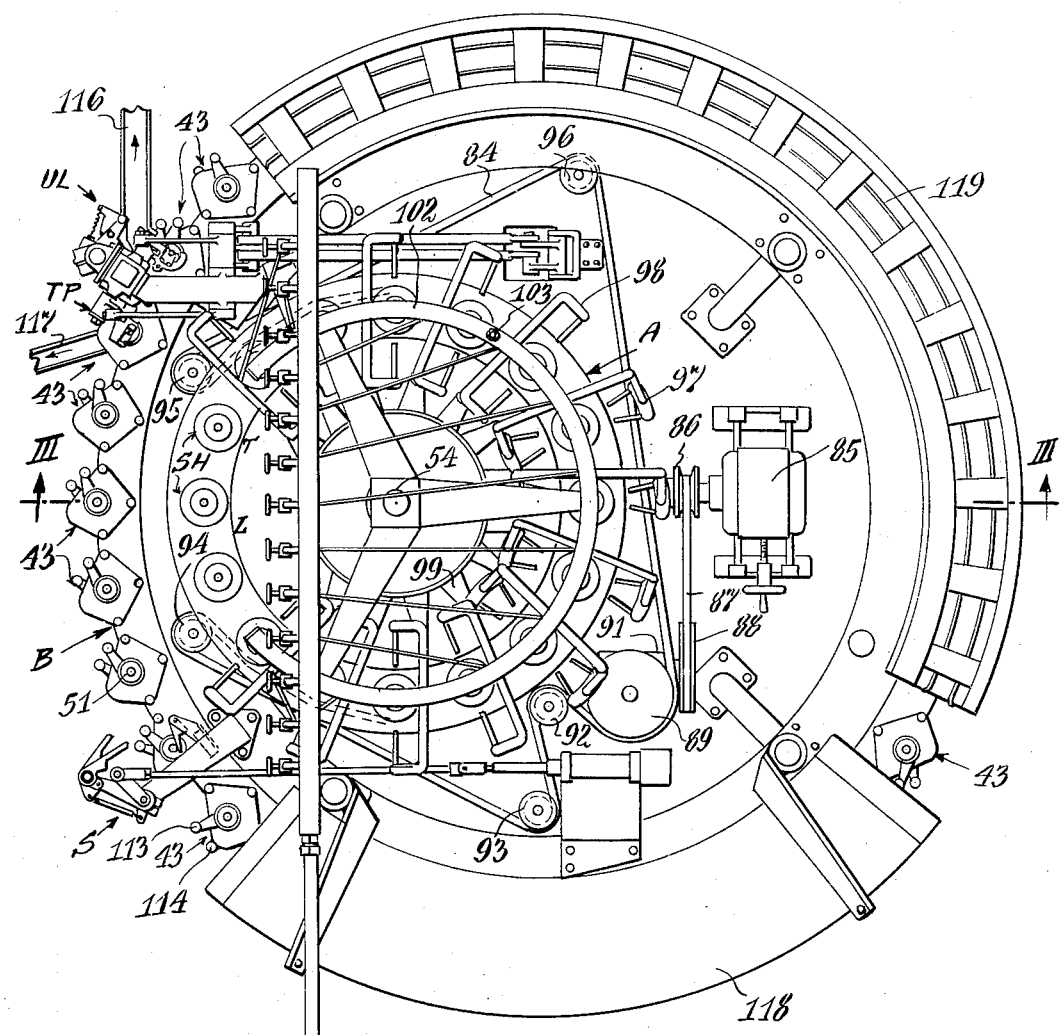
Fig. 1 is a plan view of a machine illustrating a practical embodiment of the invention.

The machine illustrated in the drawings which embodies a practical example of the present invention is adapted for evacuating electron tubes, lamp bulbs or the like. Devices of this type may contain a number of metal parts in the form of electrodes, as for example plates, grids or filaments, enclosed in a glass bulb provided with a tubular extension termed an exhaust tube.

As is the practice in the manufacture of vacuum devices, the present invention provides a machine which includes a plurality of sealing-in heads for uniting an electrode supporting stem to a bulb neck. A heat source for the above operation, provision for flushing the interior with an inert gas to prevent oxidation during the above operation, positioning the sealed-in bulb for convenient transfer to the vacuum producing system, a plurality of vacuum producing systems with the necessary electrical and cooling connections, means for automatically starting and stopping each system, heat sources in the form of ovens, high frequency bombardment and filament light-up tracks for heating the bulb and component parts and means for tipping off or closing the bulb end after the evacuating and other operations have been completed.

As will be more clearly understood from the following description, the present invention utilizes the various essential mechanical devices in the manufacture of a vacuum device, so arranged and constructed as to bring about an improved and effective result. The several manufacturing or method steps, as a result of the present co-relation between the manufacturing operations, make high production practical with minimum effort and reduced maintenance expense.

By reference to the drawings it will be found that in the illustrated embodiment of the machine three rotary platforms or conveyors are employed. For the sake of clarity these conveyors will be hereinafter identified as a "sealing-in turret" A; an "exhaust-port conveyor" B and a "pump carrier" C.

Turret A and conveyor B are rotated intermittently and are what are termed indexing conveyors. In the machine as illustrated exhaust-port conveyor B is provided with thirty-two exhaust ports. Turret A is mounted within the perimeter of conveyor B and is provided with sixteen sealing-in heads and so arranged that as the turret rotates it brings the sealing-heads successively into close relation with the exhaust ports of conveyor B. The movements of the turret A and conveyor B are so co-ordinated as to bring a sealing-in head adjacent to an exhaust port of conveyor B with each intermittent movement of the turret and conveyor, for the transfer of a sealed-in device to an exhaust port.

The pump-carrier C, which must support heavy equipment including vacuum pumps and essential parts, is rotated continuously, thus avoiding the stress and strain which would otherwise attend the operation of starting and stopping the heavily loaded carrier. Although moving continuously relative to the intermittent movement of conveyor B, the pumping operation is performed without stopping the carrier. This is accomplished in the present embodiment of the invention by connecting the exhaust ports of conveyor B to the pumps of carrier C by flexible conduits in such manner that the exhausting operation is performed without interrupting the continuous travel of the carrier C as will be hereinafter more fully described.

Figure 3:
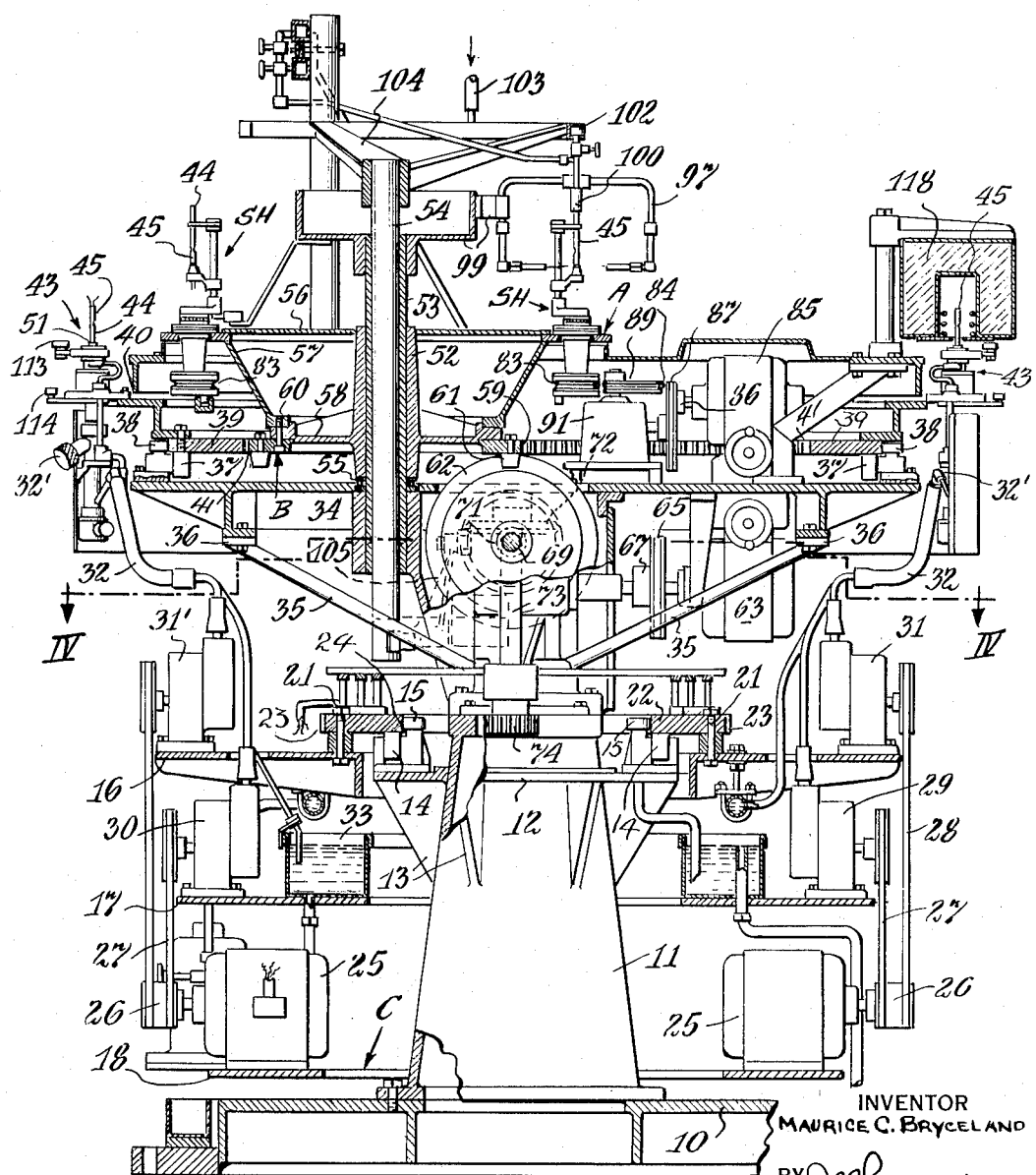
Fig. 3 is a verticle cross-sectional view of the machine taken on line III—III in Fig. 1.

As shown (see Fig. 3) a base plate 10 supports a standard 11 having an annular shelf 12 with brackets 13 secured thereto in spaced relation about the shelf and standard. The shelf serves as a support for a supporting roller 14 and lateral guide roller 15 for carrier C. The carrier C includes spaced apart annular platforms 16, 17 and 18 held in place by vertical spacer members 19 thus providing three tiers for vacuum pumps, motors and accessories. Secured to platform 16 by bolts 21 is a flat ring member 22 having external gear teeth 23, supported for rotation on rollers 14 and with its inner circumferential surface 24 in contact with guide rollers 15. Means for engaging teeth 23 to drive the carrier C will be hereinafter described.

Figure 2:
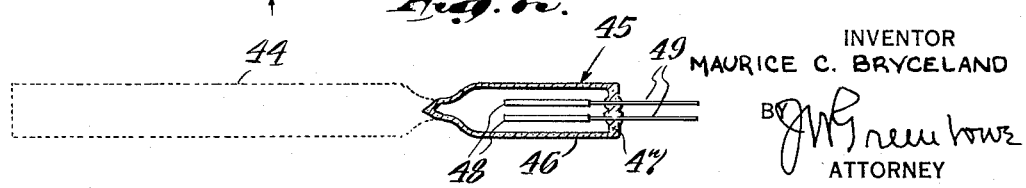
Fig. 2 shows a side view of a vacuum device of the type made on the present machine.

The carrier C transports apparatus for producing a vacuum in a vacuum device as shown in Figs. 2, when such device is supported on conveyor B. Any suitable vacuum system may be employed and the present machine provides a group of pumps for devices to be exhausted.

The present machine embodying the invention includes the exhaust-port conveyor B which is provided, as stated above, with 32 exhaust positions or ports and the carrier C is equipped with a set of pumps for each exhaust position. The pumping systems are similar and a description of one will answer for all.

As illustrated (Figs. 3 and 6) each pumping system includes a single motor 25 which drives two pairs or four mechanical pumps 29, 30 and 31, 31'. Pumps 29 and 30 are mounted on platform 17 and driven by belt 27 and pumps 31 and 31' are mounted on platform 16 and driven by belt 28. As will be noted, the heavy equipment including the above mentioned pumps and the cooling system including tanks 33, is mounted on the continuously moving carrier C. Each exhaust port on conveyor B is, however, provided with a relatively light weight oil diffusion pump 32'. The diffusion pumps of four exhaust-port positions may therefore be individually connected to four mechanical pumps. In accordance with the present invention the carrier C moves continuously whereas the conveyor B alternately moves and stops. In order to meet this condition as above mentioned the pumping operation may be performed while the carrier C is moving. The diffusion pumps 32' are therefore connected to the mechanical pumps by flexible conduits 32 which permit movement of the carrier C during the stationary periods of conveyor B.

As shown (see Fig. 3) the standard 11 supports a stationary platform or disk 34 mounted on stanchions 35, bolted at 36 to the underside thereof. This disk 34 is of circular form and provided with, spaced apart, pairs of rollers, including a supporting roller 37 and a lateral guide roller 38. Mounted for rotation on rollers 37 is an internal gear member in the form of a flat ring 39 having teeth 41 around its internal surface (see Figs. 3 and 10) and serves as exhaust-port conveyor B. The outer perimeter of member 39 is provided with an extension 40 on which are carried the exhaust-port stations 43 to receive an exhaust tube 44 of a vacuum device 45 as shown, by way of example, in Fig. 2.

The type of vacuum device shown includes a bulb 46 having a stem 47 sealed through the wall thereof in the usual manner and supporting electrodes 48 connected to lead wires 49. The exhaust tube 44, when inserted into an exhaust port 51 of a station 43 makes possible the evacuation of the bulb and the subsequent sealing or tipping off by suitable fires in the well known manner after the required exhausting operations have been performed.

The turret A carries sealing-in heads indicated as a whole by the reference character SH. The turret A (see Fig. 3) includes a central bearing hub 52 surrounding sleeve 53 which in turn surrounds a vertical reciprocal shaft 54. The shaft 54 extends beyond the ends of hub 52 for purposes to be hereinafter described. Hub 52 is rotatable on thrust bearings 55 mounted on the stationary deck 34.

Extending from and integral with the hub 52 is a turret structure including bracket members 56 and 57. These supporting brackets which constitute the frame work of the turret A are secured by bolts 60 to an annular plate 58 integral with and surrounding hub 52.

The annular plate 58, which is a part of turret A, is provided with gear teth 59 (see Fig. 10) and positioned within the perimeter of ring 39 of conveyor B in such relation that teeth 59 of turret A are in mesh with teeth 41 of conveyor B so that plate 58 may serve as a driving gear.

Figure 10:
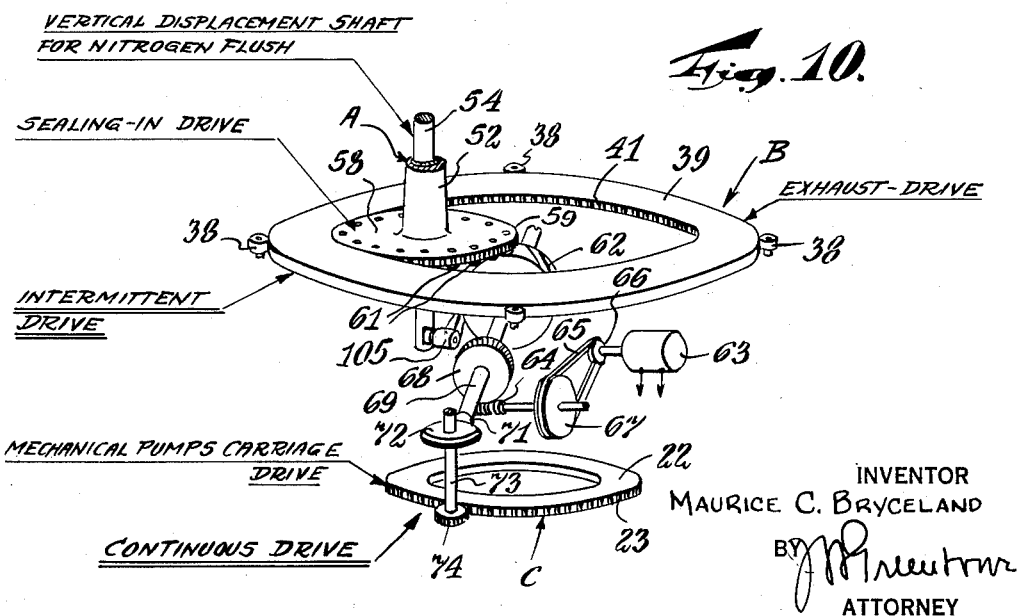
Fig. 10 is a perspective view of certain operating elements including driving mechanism sealing-in conveyor, exhaust-port conveyor and pump conveyor.

As shown in Fig. 1 and Fig. 10, the annular plate 58 of turret A is so positioned with respect to ring 39 of conveyor B that the respective gears, which may be the usual spur gears are in epicycloidal relation and so proportioned that two revolutions of the turret A will cause a single revolution of conveyor B. In the present machine the turret A drives the conveyor B. This is accomplished by providing plate 58 with cam followers 61 engaged by barrel cam 62 driven by means to be presently described.

The barrel cam drive imparts an indexing or intermittent movement to turret A which in turn, by reason of the spur gear drive causes the conveyor B to be moved intermittently. The machine as illustrated, as stated above, employs an exhaust conveyor B having thirty-two exhaust ports and a turret A having sixteen sealing-in heads. Thus with each index or intermittent movement a sealing-in head is held, for a selected time period, in stationary relation to stationary exhaust ports. It will be evident that this novel arrangement of turret for the sealing-in heads and the conveyor for the exhaust ports brings a sealing-in head and an exhaust port in close relation during each stationary period. By reason of this arrangement the transfer of a sealed-in device to an exhaust port is greatly facilitated.

The driving means for turret A, conveyor B and carrier C is shown in diagrammatical perspective in Fig. 10. As will be noted a source of power is indicated by motor 63 for driving worm 64 by means of belt 65 and pulleys 66 and 67. Worm 64 is in mesh with worm wheel 68 secured to horizontal shaft 69. This shaft which is driven by worm 64 is provided with bevel gear 71 in mesh with bevel gear 72 fixed to vertical shaft 73. The shaft 73 is provided with a spur gear 74 in mesh with teeth 23 of ring member 22 of carrier C. Thus motion is translated to continuously rotate the carrier C which supports the heavy pumps and essential exhaust equipment.

Shaft 69 driven by worm 64 is also provided with a barrel cam 62 for engaging cam followers 61, above mentioned. The cam followers, mounted on the under side of annular plate 58, when engaged by the rotating barrel cam 62 impart an intermittent rotary movement to plate 58. The plate 58, as above pointed out, is integral and a part of turret A. Thus the turret A on which the sealing-in heads SH are mounted is moved intermittently.

As stated hereinabove flat ring 39 is provided with internal gear teeth 41. Plate 58 of turret A is provided with external gear teeth 59 disposed in mesh with gear teeth 41. Thus an intermittent rotary movement of turret A will cause exhaust port conveyor B to rotate intermittently.

From the above it will be evident that the present invention provides a machine including a sealing-in turret A, and an exhaust port conveyor B intermittently rotated in combination with a continuously rotating exhaust system carrier C.

The sealing-in turret A may be equipped with any well known sealing-in head as shown for example in Fig. 7 having upright 75 supported in bearing bracket 76. The upright 75 is provided with arms 77 and 78 to support a vacuum device 45 which, in the present machine is loaded by hand. The stem 47, of the vacuum device, including the electrodes and lead wires 49 is positioned on arm 78. The bulb 46 is held by exhaust tube 44 by arm 77 for a sealing-in operation which seals the stem to the glass wall of the bulb. In sealing-in heads of this type the parts are retained in fixed alignment and driven by suitable well known means for bodily movement intermittently through a neat zone during which each head is independently rotated during the sealing of the stem to the bulb. For the purpose of rotating the sealing-in heads bearing bracket 76 is mounted on a spindle 79 in bearing 81 supported on flange 82 integral with and part of turret A.

The spindle is provided with suitable ball race 82'. As shown more clearly in Fig. 1 the pulleys of the sealing-in heads are engaged by a belt 84. This belt serves to rotate the sealing-in heads during a selected portion of their intermittent movement with turret A. Motor 85 provides the source of power for driving the belt 84 and is equipped with pulley 86 and belt 87 which drives a pulley 88 which in turn drives pulley 89 through a reduction gear box 91. Pulley 89 directly drives belt 84 which passes around idler pulleys 92, 93 and 94 and thence in contact with a selected number of pulleys 83 on the sealing-in heads SH. The present machine provides idler pulleys 95 and 96 whereby the sealing-in heads at three stations will be non-rotating, suitable means being provided to terminate such rotation to enable the operator or other means to remove a sealed bulb and transfer to an exhaust port and load the stem and bulb for another sealing-in operation as the turret A rotates intermittently.

Figure 4:
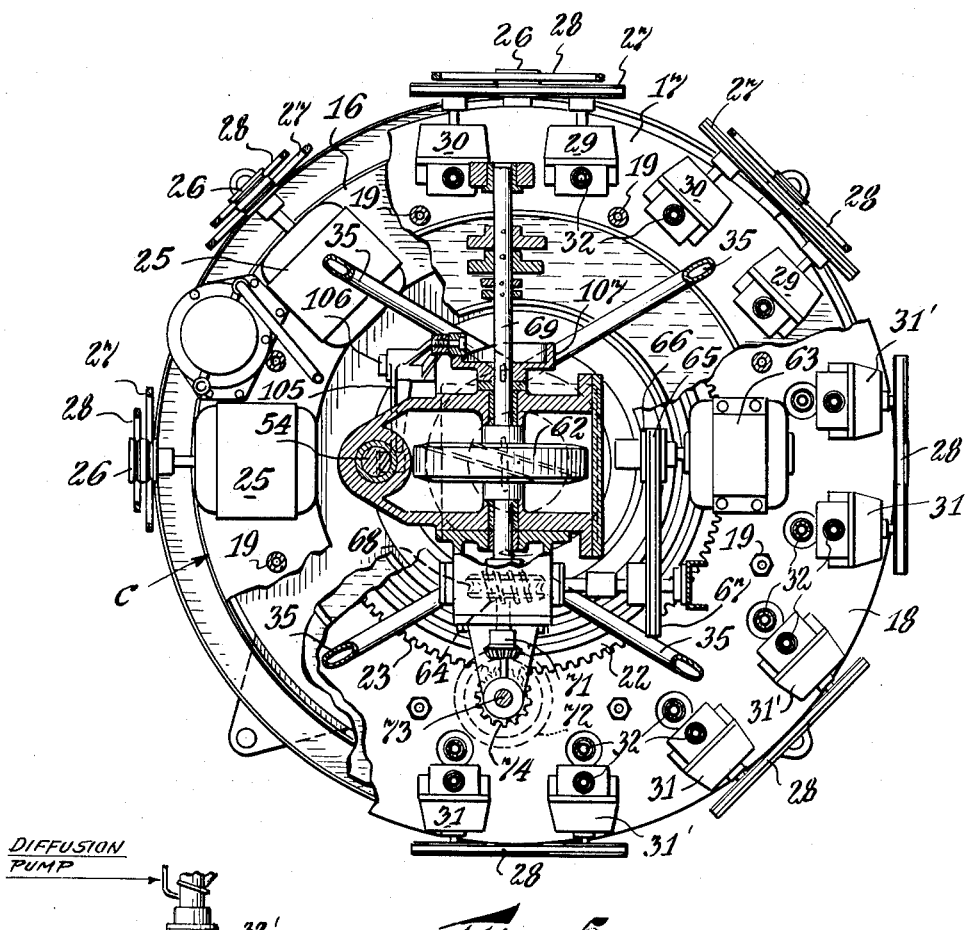
Fig. 4 is a transverse cross-sectional view taken on line IV—IV in Fig. 3.
Figure 5:
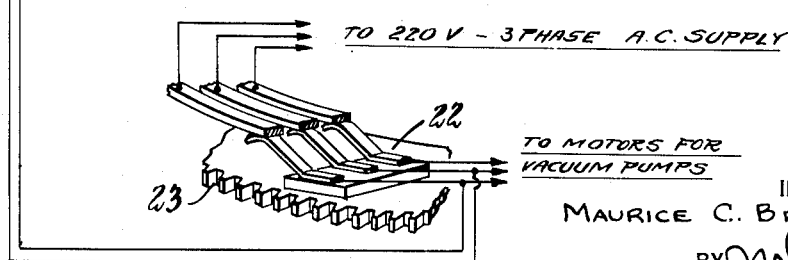
Fig. 5 is a perspective view of a wiring diagram showing wiping contacts for power supply for pumps.

During the intermittent rotation of the turret A the (see Fig. 3) sealing-in heads SH pass through fires issuing from burners 97 supported by bracket 99 mounted on sleeve 53 which in turn is secured to platform 34. The sealing-in operation is performed, in the presence of an inert gas to avoid detrimental oxidation to the metal parts. In the present machine, a nozzle 100 usually a section of a rubber tube, is moved to receive the end of exhaust tube 44 of a device for directing a flow of gas as for example nitrogen into the bulb 46 being sealed to a stem 47. The nozzle 100 connects to a manifold 102 having gas inlet 103. The manifold is carried on a spider 104 secured to one end of reciprocal shaft 54 (see Fig. 10). This shaft (see Fig. 4) is actuated by a rocker arm 105 pivoted at 106 and moved by cam 107 on shaft 69 driven by motor 63. The reciprocal movement of the shaft 54 is in timed relation to the intermittent movement of the sealing-in turret A so that the nozzle 100 is positioned to direct a flow of gas, at a selected station, during stationary periods of turret A.

Figure 9:
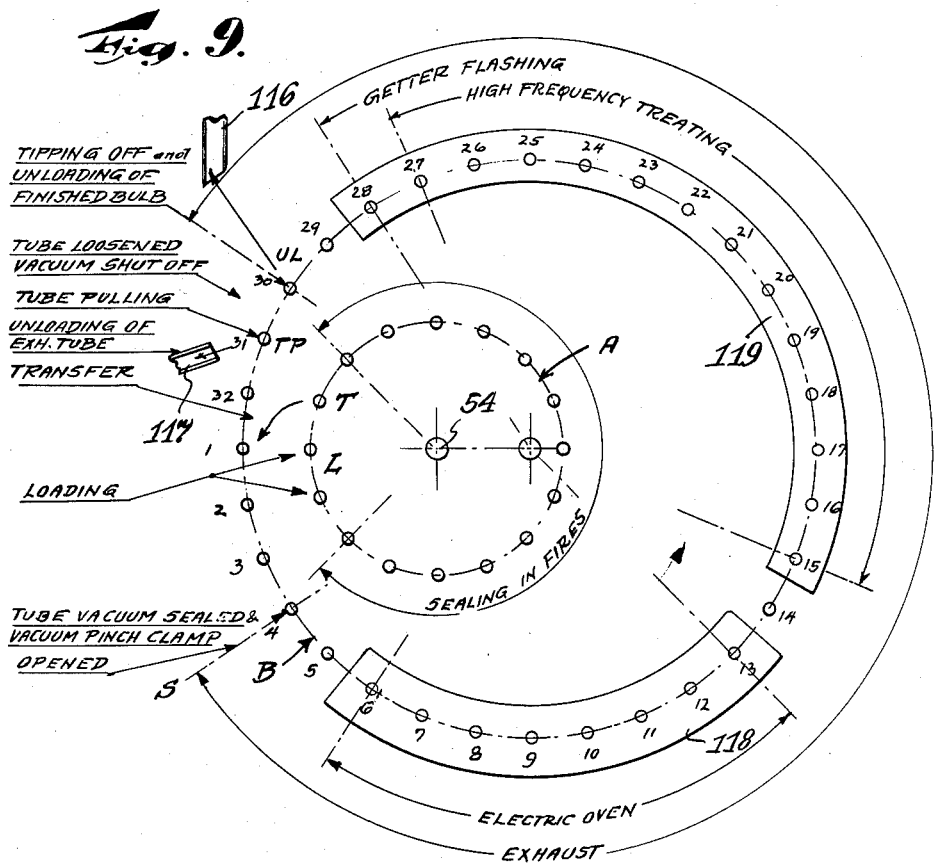
Fig. 9 is a diagrammatic view indicating the stages of operation as related to the sealing-in conveyor and exhaust-port conveyor.

As indicated in the diagram (Fig. 9) the sealed-in device is tipped off and unloaded into chute 116 at station UL. At station TP the residue tube is pulled out of the exhaust port and discarded into chute 117 and vacuum is shut off. At station T a sealed-in bulb is transferred to an exhaust port. At station L the stem and bulb are loaded in the sealing head. At station S the vacuum is sealed around the inserted exhaust tube and the pinch clamp opened for the exhausting operation as conveyor B moves the devices through oven 118, high frequency treating stage 119.

As shown in Fig. 7 a sealed-in vacuum device 45 is positioned with exhaust tube 44 in an exhaust port of conveyor B. The exhaust port may be of any well known construction and includes actuating arm 113 for effecting an air tight seal between the exhaust tube and the port and a pinch off arm 114 for closing the usual rubber tube 115 connected to a diffusion pump 32' which in turn, as stated above, is connected by flexible conduit 32 to one of the mechanical pumps supported on carrier C.

As herein shown and described, the present machine makes it possible to exhaust vacuum devices while being moved, intermittently, by continuously moving exhaust equipment.

In accomplishing the above the machine as illustrated includes an arrangement of conveyors wherein a conveyor having a relatively large number of exhaust ports is rotated about a conveyor having a relatively small number of sealing-in heads. By reason of this arrangement, an exhaust port and a sealing-in head are, at each stationary period, within convenient reach of an operator for the transfer of a sealed-in device from a sealing-in head to an exhaust port.

From the above it will be obvious that the machine disclosed may be employed to seal-in and exhaust vacuum devices irrespective of the method of exhaust which may, for example, be performed by the step by step movement of the well known flat rotary exhaust valve pumping apparatus.

The present invention provides a machine which attains the above by the combination of cooperating machine elements which function to cause a rotation of one conveyor to rotate another conveyor. One conveyor having exhaust ports different from the number of sealing-in heads carried by the other conveyor. The present invention, therefore, provides a machine for performing the sealing-in and exhaust operation required in the manufacture of vacuum devices and not only avoids the disadvantage of starting and stopping a heavily loaded pump conveyor but provides a machine in which the operator's task of transferring the sealed in device to an exhaust port is greatly facilitated.

Although a preferred embodiment of the invention is shown and described herein, it is to be understood that modifications may be made therein without departing from the spirit and scope of the invention as set forth in the appended claims.

I claim:

1. In a machine of the character described, a rotary conveyor, exhaust ports in spaced relation around the perimeter of said conveyor, means for rotating said conveyor intermittently, a second rotary conveyor positioned within the perimeter of said first mentioned conveyor, sealing-in heads in spaced relation around the perimeter of said second conveyor, means for rotating said conveyors intermittently in timed relation, a third rotary coveyor, a vacuum system mounted on said third conveyor, means for moving said third conveyor continuously through a path adjacent to the path of movement of said first mentioned conveyor, and means connecting said vacuum system with said exhaust ports.

2. A machine of the class described, comprising a rotary exhaust port conveyor, exhaust ports disposed in spaced relation around the perimeter of said conveyor, a rotary turret having a diameter less than the diameter of said conveyor, means for supporting said turret within the perimeter of said conveyor with the perimeter of said turret adjacent to the perimeter of said conveyor, sealing-in heads disposed in spaced relation around the perimeter of said turret, means for causing said conveyor and turret to rotate intermittently in timed relation to position a sealing-in head adjacent to an exhaust port during stationary periods of said conveyor and turret, a rotatable carrier for a vacuum system movable through a path adjacent to the path of travel of said conveyor, means for moving said carrier continuously one revolution for each revolution of said conveyor, and means connecting said vacuum system with said exahust ports.

3. A machine of the class described, comprising a rotary conveyor, exhaust ports disposed in spaced relation around the perimeter of said conveyor to receive the exhaust tube of a vacuum device, a rotary turret having a diameter less than the diameter of said conveyor, means for supporting said turret for rotation with the perimeter of said turret adjacent to the perimeter of said conveyor, sealing-in heads for vacuum devices having exhaust tubes disposed in spaced relation around the perimeter of said turret, means for causing said conveyor and turret to rotate intermittently in timed relation to position a sealing-in head adjacent to an exhaust port during stationary periods of said conveyor and turret to facilitate the insertion of an exhaust tube of a vacuum device into an exhaust port, a rotatable carrier for a vacuum system movable through a path adjacent to the path of travel of said conveyor, means for moving said carrier one revolution for each revolution of said conveyor, flexible conduits for connecting said vacuum system with said exhaust ports to exhaust vacuum devices having exhaust tubes thereof inserted in said exhaust ports.

4. A machine of the class described, comprising a rotary conveyor, a rotary turret, exhaust ports disposed in spaced relation around the perimeter of said conveyor means for supporting said turret for rotation within the perimeter of said conveyor with the perimeter of said turret adjacent to the perimeter of said conveyor, sealing-in heads for vacuum devices having exhaust tubes disposed in spaced relation around the perimeter of said turret, means for causing said conveyor and turret to rotate intermittently in timed relation to position a sealing-in head adjacent to an exhaust port during stationary periods of said conveyor and turret to facilitate the inser- tion of an exhaust tube of a vacuum device into an exhaust port, a rotatable carrier for a vacuum system movable through a path adjacent to the path of travel of said conveyor, means for moving said carrier one revolution for each revolution of said conveyor, flexible conduits for connecting said vacuum system with said exhaust ports to exhaust vacuum devices having exhaust tubes thereof inserted in said exhaust ports.

5. In a machine of the character described, a conveyor having exhaust ports to receive articles to be evacuated, means for moving said conveyor intermittently, a second conveyor, means for moving said second conveyor continuously, exhaust pumps mounted on said second conveyor and means connecting said pumps to said exhaust ports, said means cooperating with said pumps to evacuate articles connected to said exhaust ports during stationary periods of said exhaust ports and during relative movement of said pumps carried by said continuously moving conveyor.

6. In a machine of the character described, a conveyor having exhaust ports to receive articles to be evacuated, means for moving said conveyor intermittently, a second conveyor, means for moving said second conveyor continuously exhaust pumps mounted on said second conveyor and flexible conduits connecting said pumps to said exhaust ports, said conduits cooperating with said pumps to evacuate articles connected to said exhaust ports during stationary periods of said exhaust ports and during relative movement of said pumps carried by said continuously moving conveyor.

7. In a machine of the character described, a rotary conveyor having a plurality of exhaust ports disposed in spaced relation adjacent to the periphery of said conveyor to receive articles to be evacuated, means for intermittently rotating said conveyor, a rotatable carrier, a plurality of vacuum pumps equal in number to said exhaust ports mounted on said carrier, means for moving said carrier one continuous revolution for each intermittent revolution of said conveyor and means connecting said exhaust ports with said vacuum pumps for evacuating said articles during the continuous movement of said carrier.

8. In a machine of the character described, a rotary conveyor having a plurality of exhaust ports disposed in spaced relation adjacent to the periphery of said conveyor to receive articles to be evacuated, means for intermittently rotating said conveyor, a rotatable carrier, a plurality of vacuum pumps equal in number to said exhaust ports mounted on said carrier, means for moving said carrier one continuous revolution for each intermittent revolution of said conveyor and flexible conduits connecting said exhaust ports with said vacuum pumps for evacuating said articles during the continuous movement of said carrier.

References Cited in the file of this patent

UNITED STATES PATENTS

| | | |
|---|---|---|
| 557,029 | Schaake | Mar. 24, 1896 |
| 1,210,620 | Fagan et al. | Jan. 2, 1917 |
| 1,276,987 | Stockton | Aug. 27, 1918 |
| 1,651,865 | Blake et al. | Dec. 6, 1927 |
| 2,533,919 | Christiansen et al. | Dec. 12, 1950 |